Aug. 24, 1965

A. C. ACKERMAN 3,201,987

MASS FLOW METER

Filed Oct. 1, 1962

INVENTOR.
ARTHUR CHARLES ACKERMAN
BY

*R. E. Jeangue*

ATTORNEY

_United States Patent Office_

3,201,987
Patented Aug. 24, 1965

3,201,987
MASS FLOW METER
Arthur Charles Ackerman, 6761 Lionel Place,
Canoga Park, Calif.
Filed Oct. 1, 1962, Ser. No. 227,442
10 Claims. (Cl. 73—231)

This invention relates to a turbine type inferential mass flow meter which reports the mass rate of flow of fluids, either liquid or gas, or a combination.

*Turbine-type mass flow meters*

In one turbine-type, true mass flow meter, an impeller is driven at a constant speed of rotation to impart an angular velocity to the fluid to be measured. A turbine is arranged to intercept the moving fluid and is acted upon by the moving fluid in proportion to the momentum of the fluid. Deflection of the turbine is restrained by resilient means and the degree of the deflection serves as an indication of the mass flow rate of the fluid.

Conventional turbine type, inferential flow meters may employ shaped surfaces, strain gages or piezo crystal transducers, and control loop circuitry to obtain the desired indication of mass flow rate of the fluid. The operational theory of these devices is usually based upon variations of the force-mass momentum relationship. They are generally characterized by complicated mechanical and electrical mechanisms and as such are limited by manufacturing tolerances and the requirement of precision regulation of the power supply.

*The flow meter of the present invention*

The flow meter of the present invention employs two turbines, and operates in an entirely different manner than the conventional types. The first turbine is a free-running turbine that is operated, not by independent means as an impeller, but by the fluid to be measured. The fluid then passes through a flow decoupling device before reaching the second turbine. The second turbine is loaded in such a manner that the power generated by it is a known function of its speed. It too is operated by the fluid to be measured and not by independent means. The basic meter does not require an external power source for its operation. It has relatively few parts and is designed for in-line installation. This results in a mass flow meter which is simple, rugged, compact and reliable.

An object of the invention is to provide a mass flow meter which generates two signals from which mass flow can be determined.

Another object of the invention is to provide a mass flow meter which may be employed to measure the mass flow rate of fluids, either liquid or gas or a combination.

Still another object of the invention is to provide a mass flow meter which may be installed directly in a conduit carrying the fluid to be measured.

A further object of the invention is to provide a mass flow meter which may be employed as a control element, a monitor or a summing device.

Another object of the invention is to provide a mass flow meter which does not require external power for its operation.

Yet another object of the invention is to provide a mass flow meter of the turbine type employing a free-running turbine that operates at a runaway condition to generate a first signal, a second turbine which generates a second signal against a load which is a known function of its speed, and flow decoupling means intermediate to the turbines.

These and other more specific objects will appear upon reading the following specification and claims and upon considering in connection therewith the attached drawings to which they relate.

*Basic meter structure*

Referring now to the drawings, in which a presently preferred embodiment of the invention is illustrated:

Figure 1:
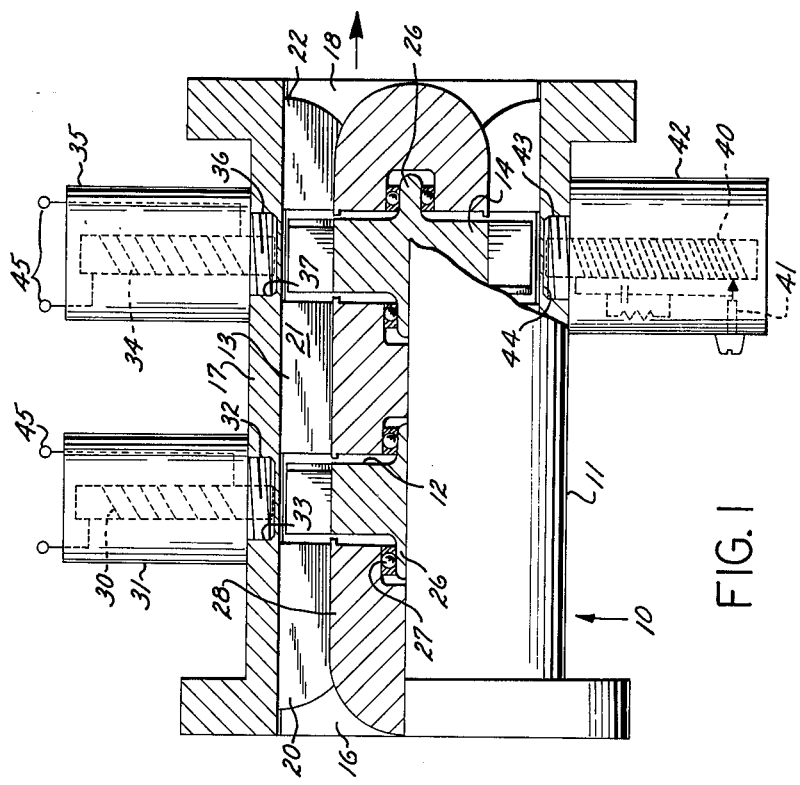
FIGURE 1 is an elevational view, partially in longitudinal cross-section, of a flow meter of the invention.
Figure 2:
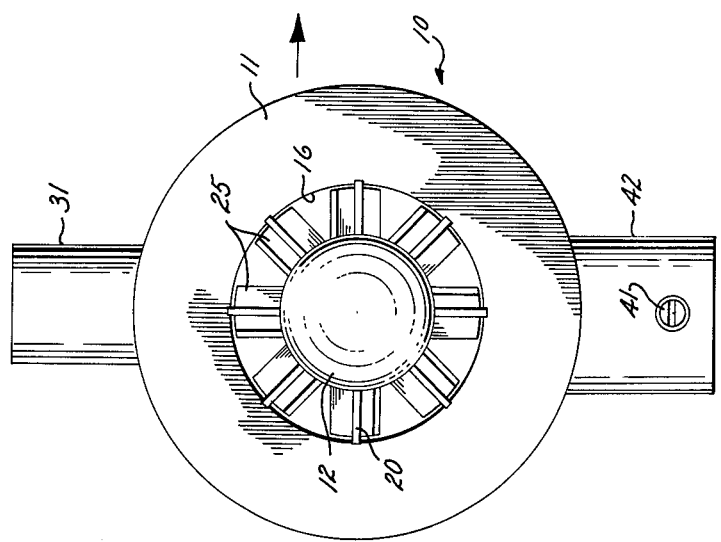
FIGURE 2 is a plan view of the flow meter of FIGURE 1.

Referring again to the drawings, the flow meter constituting the present invention, generally designated 10, includes a casing 11 in which is mounted a first turbine rotor 12, a flow decoupling device 13, and a second turbine rotor 14.

The casing 11 may be provided with flanges at each end or other suitable means for connecting it with conduits and includes an inlet section 16, a decoupling section 17 and an outlet section 18. Although the meter 10, as will be pointed out hereinafter, is capable of accepting flow in either direction, the sections 16 and 18 are referred to as inlet and outlet sections, respectively, in the interest of clarity. A plurality of high solidity vanes 20 are mounted in the inlet section 16 to remove swirl from the flow, dampen large scale turbulence and minimize flow distortions. Also, the vanes 20 form an inlet stator blade row to the first turbine rotor 12. A second set of high solidity vanes 21 is mounted in the decoupling section 17 to form the flow decoupling device 13 which prevents cross-coupling, removes swirl induced in the flow by the first turbine rotor 12 and also prevents any flow distortions which might be induced by the rotor 14 from influencing the first turbine rotor 12. In addition, the second set of vanes 21 forms the inlet stator blade row of the second turbine rotor 14. A third set of high solidity vanes 22 is mounted in the outlet section 18 to smooth the flow leaving the flow meter 10. It is to be noted that, while high solidity vanes are not usually employed in the outlet sections of such devices, they are employed in the outlet section of the meter of the present invention to adapt it to accept flow in either direction. Each turbine rotor 12, 14 includes a plurality of blades 25, which are fabricated from magnetic-type materials, and an integral shaft 26 which is rotatably mounted in a set of bearings 27. While an even number of blades and vanes are shown for clarity, it will be readily understood by those skilled in the art that a prime number is preferably employed in actual practice. The bearings 27 are mounted in bearing housings 28 which are supported within the casing 11 by means of the flow-straightening vanes.

A first signal coil 30 is mounted in a housing 31 having an externally threaded portion 32 adapted to engage an internally threaded recess 33 in the sidewall of the casing 11 adjacent the tips of the blades 25 of the first rotor 12. A second signal coil 34 is mounted in a housing 35 having an externally threaded portion 36 adapted to threadedly engage an internally threaded recess 37 which is mounted in the casing 11 adjacent the tips of the blades 25 of the second rotor 14. A load coil 40 includes a calibration adjustment 41 which is shown schematically as an eccentric type adjustment and which may be employed to adjust the coil 40 by reducing the number of acting turns. This adjustment is done before using the meter for the first time to compensate for any errors introduced into the system due to manufacturing inaccuracies. The coil 40 is mounted in a housing 42 having an externally threaded portion 43 threadedly engaging the internal threads of a recess 44 in the casing 11 adjacent the tips of the rotor blades 25 of the rotor 14. Electrical leads 45 are provided on each coil 30 and 34 to connect them to suitable measuring, monitoring or summing devices.

The casing 11, vanes 20, 21 and 22, shaft 26, housings 28 and similar elements are made of a suitable non-magnetic material such as aluminum or non-magnetic stainless steel.

Figure 3:
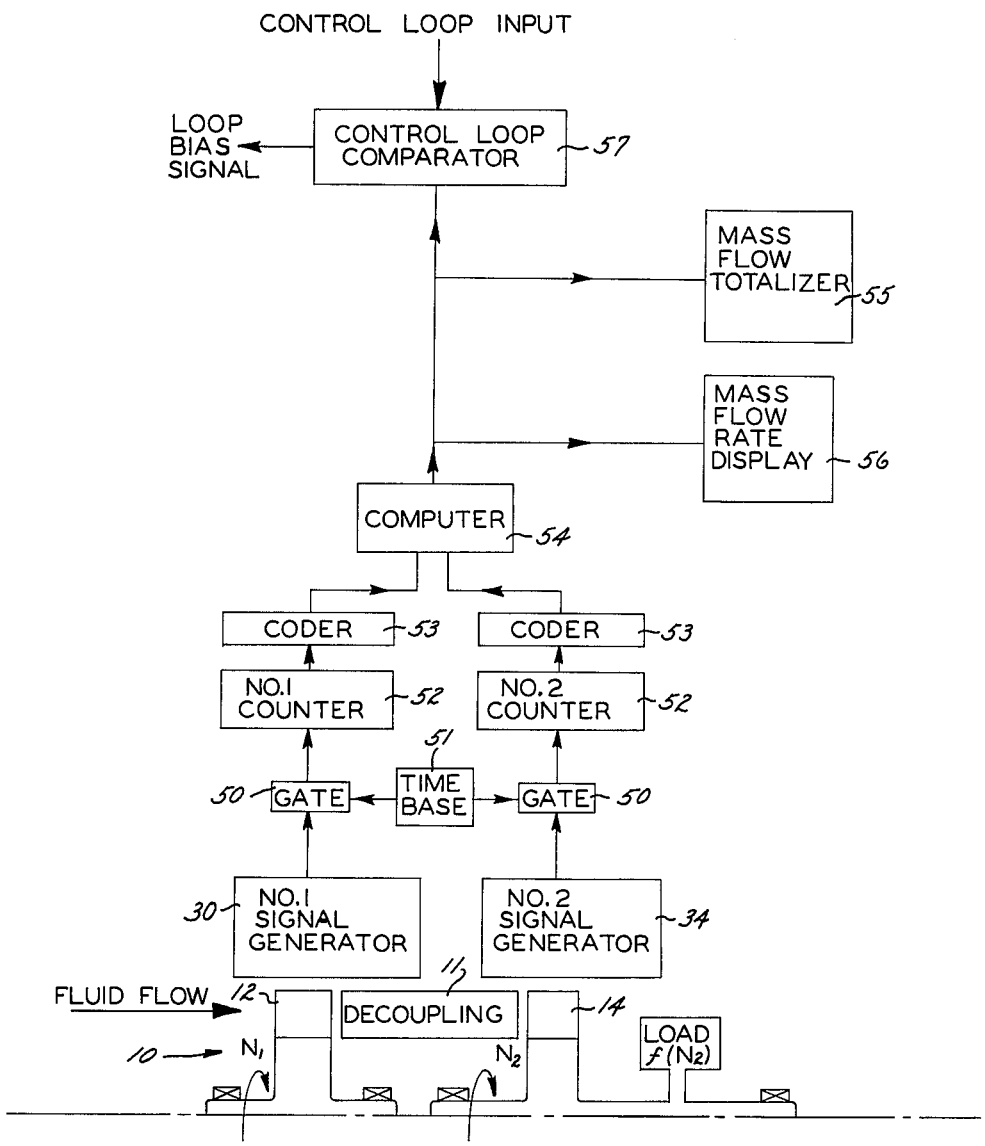
FIGURE 3 is a schematic diagram of a flow meter of the invention and its associated correlation means.

Referring now to FIGURE 3, the read-out equipment and circuitry which may be employed with the flow meter 10 are contingent on the type of signal generated and the application of the meter, i.e., a monitor, a summing device or a control element. For purposes of illustration, but not of limitation, the read-out equipment shown includes gates 50 which are connected to the coils 30 and 34 to receive the digital signals therefrom. A time base 51 is connected to the gates 50 to actuate the gating circuit. Signals are fed from the gates 50 to pulse counters 52. At the end of the sweep the resulting counts are fed into coders 53 from which coded counts are fed into a computer 54 which computes the mass flow. The output signal from the computer is then fed into a mass flow totalizer 55, a mass flow rate display 56 and a comparator 57.

*Theory of operation of the device*

For a fixed orifice system, a turbine under no load condition runs at a runaway speed and under load at another, but slower speed. The speed under load depends upon the magnitude of the load and the power-generating ability of the turbine. The power-generating ability of a fixed orifice turbine is a function of only the turbine mass flow and the rotational velocity. If a load which is a known function of turbine speed is imposed on the turbine and the ratio of the turbine runaway speed to its loaded speed is known, then the mass flow rate of the driving fluid can be determined.

The speeds of turbines 12 and 14 are determined from the generated frequency of the electrical coils 30 and 34. These generators are designed to emit readable signals with negligible power consumption. The rotor blades 25 are of a magnetic material, which in passing the coils 30 and 34, which are also of magnetic-type materials, cause a change in the flux linkages of the coils. This flux pulsing, generates a fluctuating voltage in each coil, which is the required signal. However, though the signal voltage is proportional to the rotor speed, it is the voltage frequency that is used to determine the rotor speed.

Since rotors 12 and 14 each have a fixed number of blades, $z$, the electrical signal frequency, $f = k_{1z}N$ where $k_1$ is a constant and $N$ is rotational speed.

The second turbine rotor 14 is loaded by means of a second but much larger induction (eddy-current) coil 40, which imposes a measurable load on the turbine 14. The power is dissipated in the coil circuit. The load circuit is sized so that the reactance is negligible for the desired operating range. In this instance, then, the power load is directly proportional to the square of the voltage and since the voltage is directly proportional to the frequency and hence the rotor speed, the load power is directly proportional to the square of the frequency, i.e., turbine power $P_{hp} = k_2(f_{14})^2$, where $k_2$ is a constant.

The exact equation for this type loading device over a very broad operating range is a more complex equation, but it is still only a function of frequency, i.e. $P_{hp} = \psi(f_{14})$. Thus the applicable loading equation is contingent upon the desired operating range and the desired accuracy within this range. It can be proven that the general mass flow rate equation for the meter of this invention is $$\dot{m} = k_3 \psi(f_{14}) \div (f_{14})^2 \times \left[ k_4 \left( \frac{f_{12}}{f_{14}} \right) - 1 \right]$$

where $k_3$ and $k_4$ are constants. If the turbines 12 and 14 are designed so that $k_4$ is equal to one, and since turbine power $P_{hp}$, is also proportional to the square of the turbine frequency $f_{14}$, times a constant $k_2$, then $$\dot{m} = k_5 \div \left[ \left( \frac{f_{12}}{f_{14}} \right) - 1 \right]$$

where $k_5$ is a constant.

*Operation of the device*

Fluid flow enters the meter 10 at the left, as viewed in FIGURE 1, sucessively passing through the inlet section 16, turbine rotor 12, decoupling section 13, turbine rotor 14, and outlet section 18.

Turbine 12 and coil 30, as a unit, form the runaway speed signal generator. The flow impinging upon the blades 25 of the turbine 12, cause it to rotate at a certain speed. Since the power generated by this unit is negligible, this rotative speed is the turbine runaway speed.

The turbine 14 and coil 34, as a unit, form the load speed signal generator with coil 34 being identical to coil 30. The turbine 14 and coil 40 form the load generator which imposes a measurable power load on rotor 14 (the load imposed by coil 34 being negligible). Since this power load is only a function of frequency and, hence, only a function of rotor speed, the flow impinging on turbine 14 causes it to rotate at a speed determined by the mass rate of the flow and the magnitude of the load.

While the particular flow meter herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A meter for measuring the mass flow rate of a fluid comprising:
    a casing for directing the flow of said fluid;
    a first free running turbine mounted in said casing for rotation by incoming fluid;
    a second turbine rotatably mounted at a location in said casing spaced from said first turbine means for loading said second turbine with a load which is a known function of the rotative speed of said second turbine when rotated by the fluid leaving said free running turbine;
    flow decoupling means mounted in said casing intermediate to said turbines for decoupling each turbine from flow distortion produced by the other turbine;
    means for measuring the speed of each of said turbines; and
    means responsive to said measuring means for obtaining the ratio of said speeds from which the mass flow rate of said fluid can be derived.

2. A mass flow meter comprising:
    a casing for directing a fluid the mass flow rate of which is to be measured;
    a first free running turbine mounted in said casing for rotation by said fluid;
    a second turbine separately mounted in said casing for rotation by fluid leaving said first turbine;
    means for placing a load upon said second turbine which is a known function of the speed of said second turbine;
    vane means mounted in said casing intermediate said turbines for decoupling each of said turbines from flow distortion produced by the other turbine;
    first signal generating means responsive to movement of said first turbine for generating a signal which is a function of the velocity imparted to said first turbine by said fluid;
    second signal generating means responsive to movement of said second turbine for generating a signal which is a function of the velocity imparted to said second turbine by said fluid; and
    means responsive to said first and second generating means for obtaining the ratio of said signals from which the mass flow rate of said fluid can be derived.

3. The flow meter of claim 2 wherein first magnetic means is secured to a peripheral portion of said first turbine and said first signal generating means includes a second magnetic means secured to said casing in flux coupling relationship with said first magnetic means.

4. The flow meter of claim 2 wherein first magnetic means is secured to a peripheral portion of said second turbine and said second signal generating means includes a second magnetic means secured to said casing in flux coupling relationship with said first magnetic means.

5. The flow meter of claim 3 wherein second magnetic means is secured to a peripheral portion of said second turbine and said second signal generating means includes third and fourth magnetic means secured to said casing in flux coupling relationship with said second magnetic means.

6. The flow meter of claim 2 wherein said means for placing a load upon said second turbine comprises:
   magnetic means secured to a peripheral portion of said second turbine; and
   an induction coil secured to said casing in flux coupling relationship with said magnetic means to form an element of a load circuit, said load circuit having a negligible reactance at the design operating speed of said second turbine.

7. The flow meter of claim 2 wherein the means for obtaining the ratio of said signals comprises:
   a gating circuit electrically connected to said first and second signal generating means;
   a time base for actuating said gating circuit;
   pulse counting means for receiving signals from said gating circuit;
   coding means for coding pulses received from said pulse counting means; and
   computing means computing the ratio of said coded pulses.

8. A meter for measuring the mass flow rate of a fluid flowing in a conduit comprising:
   a first free running turbine rotatably mounted in said conduit;
   a second turbine rotatably mounted in said conduit at a location spaced from said first turbine;
   flow decoupling means mounted in said conduit intermediate to said turbines for decoupling each turbine from flow distortion produced by the other turbine;
   means for coupling a load to said second turbine which is a known function of the rotative speed of said second turbine;
   means for measuring the speed of each of said turbines; and
   means responsive to said measuring means for obtaining the ratio of said speeds from which the mass flow rate of said fluid can be derived.

9. A mass flow meter comprising:
   a casing having an inlet portion, an outlet portion and an intermediate portion;
   a turbine rotatably mounted in each of said inlet and outlet portions, each of said turbines including blades of magnetic material;
   flow decoupling means mounted in said intermediate portion for decoupling each turbine from flow distortion produced by the other turbine;
   an electrical signal generating means mounted on said casing in flux coupling relationship with each of said turbines; and
   an electrical power generating means mounted on said casing in flux coupling relationship with said outlet-portion turbine to produce a load thereon which is a known function of the rotative speed of said outlet-portion turbine.

10. A meter for measuring the mass flow rate of a fluid flowing in a conduit comprising:
   a first free running turbine rotatably mounted in said conduit;
   a second turbine rotatably mounted in said conduit at a location spaced from said first turbine and comprising a plurality of blades each having a portion of magnetic material;
   means for coupling a load to said second turbine which is a known function of the rotative speed of said second turbine;
   said load comprising a variable reluctance generator located to be responsive to said magnetic blade portions as the blades move past said generator;
   means for measuring the speed of each of said turbines; and
   means responsive to said measuring means for obtaining the ratio of said speeds from which the mass flow rate of said fluid can be derived.

References Cited by the Examiner

UNITED STATES PATENTS

| 720,188 | 2/03 | Seidener | 73—194 |
| 3,043,138 | 7/62 | Waugh | 73—194 |
| 3,144,769 | 8/64 | Francisco | 73—231 |

FOREIGN PATENTS

| 860,657 | 2/61 | Great Britain. |

RICHARD C. QUEISSER, *Primary Examiner.*